United States Patent
Gopalsamy et al.

(10) Patent No.: US 10,387,922 B2
(45) Date of Patent: Aug. 20, 2019

(54) PREDICTIVE ITEM BUNDLING RECOMMENDATION SYSTEMS AND METHODS

(71) Applicant: Wal-Mart Stores, Inc., Bentonville, AR (US)

(72) Inventors: Srikannan Gopalsamy, Foster City, CA (US); Pavel Kalinin, Belmont, CA (US); Minseok Park, Burlingame, CA (US); Jeevan Ananth, Fremont, CA (US); John Ziqiang Wang, Pleasanton, CA (US); Murthy Srikanth Srinivasa, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1109 days.

(21) Appl. No.: 13/907,746

(22) Filed: May 31, 2013

(65) Prior Publication Data

US 2014/0358665 A1    Dec. 4, 2014

(51) Int. Cl.
*G06Q 30/00* (2012.01)
*G06Q 30/02* (2012.01)

(52) U.S. Cl.
CPC ................................ *G06Q 30/0276* (2013.01)

(58) Field of Classification Search
CPC ............... G06Q 30/00; G06Q 30/0283; G06Q 30/0601; G06Q 30/06; G06Q 30/0631
See application file for complete search history.

(56) References Cited

U.S. PATENT DOCUMENTS

| | | | |
|---|---|---|---|
| 5,727,162 A * | 3/1998 | Nakamura | G07G 1/12 705/25 |
| 7,533,093 B2 | 5/2009 | Gutta | |
| 7,672,877 B1 | 3/2010 | Acton | |
| 7,743,059 B2 | 6/2010 | Chan | |
| 7,870,039 B1 | 1/2011 | Dom | |
| 7,966,225 B2 | 6/2011 | Chan | |
| 8,095,521 B2 | 1/2012 | Chan | |
| 8,285,602 B1 * | 10/2012 | Yi | G06Q 30/00 705/26.7 |
| 8,438,052 B1 * | 5/2013 | Chanda | G06Q 30/0207 705/7.11 |
| 9,483,789 B1 * | 11/2016 | Hanlon | G06Q 30/0631 |
| 2003/0097196 A1 | 5/2003 | Gutta | |
| 2006/0095370 A1 | 5/2006 | Seth | |
| 2007/0022021 A1 | 1/2007 | Walker | |
| 2008/0120174 A1 * | 5/2008 | Li | G06Q 30/02 705/14.26 |
| 2009/0138365 A1 * | 5/2009 | Mueller | G06Q 20/12 705/14.19 |
| 2012/0310731 A1 * | 12/2012 | Li | G06Q 30/0631 705/14.45 |

* cited by examiner

*Primary Examiner* — Joseph D Burgess
(74) *Attorney, Agent, or Firm* — Bryan Cave Leighton Paisner LLP (57) ABSTRACT

Example online payment systems and methods are described. In one implementation, a method generates a list of a plurality of candidate items that can be associated to a base item to form a plurality of bundles. The method also displays the list of candidate items to the user in a ranked order.

22 Claims, 8 Drawing Sheets

PREDICTIVE ITEM BUNDLING RECOMMENDATION SYSTEMS AND METHODS

TECHNICAL FIELD

The present disclosure relates to predictive item bundling recommendation systems and methods that predictively recommend bundles of items for a given item in a ranked order.

BACKGROUND

Merchants of products typically need to go through a tedious and time-consuming process to configure a bundle of products to offer to consumers. Often time, the process requires the merchant to check in various systems and use different tools to gather information manually in order to configure a bundle. However, the process would generally take many hours or even days.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein allow predictive grouping of items, or goods, that will sell well together into bundles that will allow for more competitive pricing and higher sales volume. A variety of types of data, or item information, related to items available for bundling are aggregated from a number of sources. The aggregated data, or item information, for each item is indexed and made searchable for facilitate fast retrieval, and is cached or stored to improve user experience. When a base item is identified, e.g., the item for which one or more bundles are to be configured, the base item and a number of candidate items, e.g., items that may be suitable for bundling with the base item, are grouped into a respective number of bundles. The items are also ranked in an order indicative of suitability of each item for bundling with the base item. The ranking may be based on one or more factors, including but not limited to: the number of times the items have been configured together in all the markets, the number of times the items have been recommended by a customer relationship management (CRM) personalized tool to be a bundle with different combinations, customer purchase behavior (e.g., items frequently bought together), top selling items based on the quantity ordered, and item competitive price margin. The ranked items are displayed as item bundling recommendation to a user, e.g., a merchant utilizing a system or method of the present disclosure. Profit margin regarding each configured bundle is calculated and displayed to the user. For any given bundle, the user may add one or more items to or delete one or more items from the bundle to re-configure the bundle, and a new profit margin thereof is calculated and displayed to the user. Performance of the bundles, e.g., sales volume of each bundle, may be tracked and displayed to the user as well as be used in future grouping of items to predictively configure bundles for recommendation to the user.

Advantageously, systems and methods described herein help merchants as well as consumers to configure new bundles. A user inputs a base item and receives recommendations in a ranked order on candidate items with which the base item can be bundled. This allows the user to create new bundles faster, compared with existing approaches, and allows the user to optimize existing bundles for enhanced profit margin, popularity of items/bundles and other goals.

Figure 1:
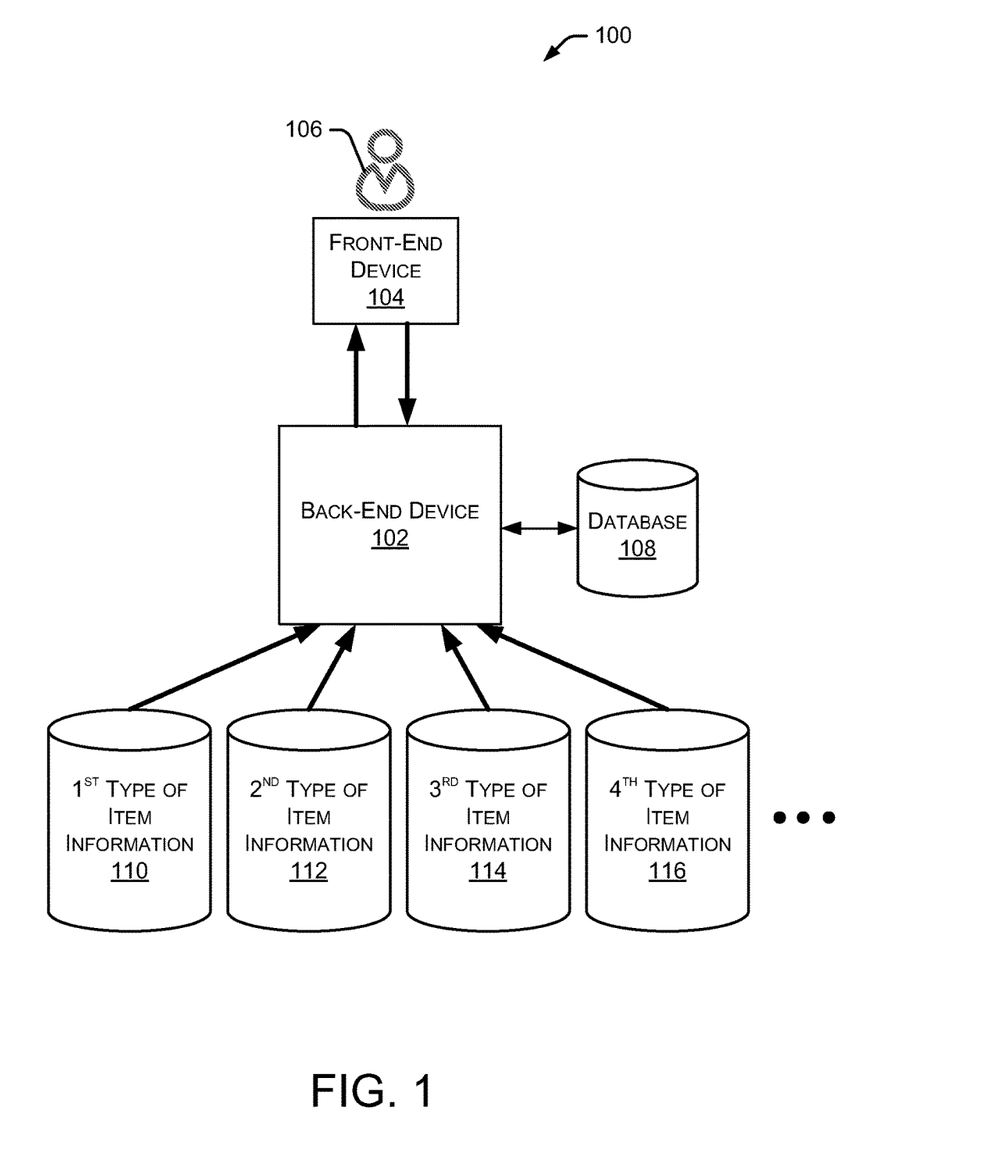
FIG. 1 is a block diagram depicting a framework within which an example embodiment of the present disclosure may be implemented.

FIG. 1 is a block diagram depicting a framework 100 within which an example embodiment of the present disclosure may be implemented. Framework 100 includes back-end device 102 and front-end device 104. Optionally, database 108 may be communicatively coupled to back-end device 102 to cache or otherwise store some or all of the information and data received, collected and aggregated by back-end device 102. In some implementations, database 108 may be an integral part of back-end device 102. Back-end device 102 may be any type of computing device such as, for example, one or more of a desktop computer, a workstation, a server, a mainframe computer, a portable device, etc. Front-end device 104 may be any type of user-interface device including, for example, a combination of one or more of a display panel, a monitor, a keyboard, a computer mouse, a stylus, a keypad, a touch-sensing screen, a voice-command device, or any suitable user-interface device conceivable in the future. Alternatively, front-end device 104 may be any type of computing device such as, for example, a desktop computer, a workstation, a laptop computer, a notebook computer, a tablet, a smartphone, a personal digital assistant, or any suitable handheld device.

Back-end device 102 and front-end device 104 may be integral parts of an apparatus or, alternatively, may be communicatively coupled directly or indirectly through one or more communication devices or one or more networks. In implementations where back-end device 102 and front-end device 104 communicate with one another through one or more networks, the one or more networks may include, for example, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN) or the Internet. In implementations where back-end device 102 and front-end device 104 communicate with one another through one or more networks including at least one wireless network, the at least one wireless network may be, for example, based on one or more wireless standards such as IEEE 802.11 standards, WiFi, Bluetooth, infrared, WiMax, 2G, 2.5G, 3G, 4G, Long Term Evolution (LTE) and/or future versions and/or derivatives thereof.

User 106 operates front-end device 104 to access back-end device 102. For example, user 106 selects or otherwise identifies a single item, referred to as "base item" hereinafter, for which user 106 desires bundle recommendation from back-end device 102. In response, back-end device 102 provides bundle recommendation in the form of a list of recommended bundles or a list of candidate items that may be suitable to be bundled with the base item. The list of bundles or candidate items may be in a ranked order, e.g., listed in a descending order of preference. The order of preference may be based on, for example, profit margins from merchant's perspective, cost savings from consumer's perspective, popularity of bundles in view of past sales volume, etc. The list of bundles or candidate items is displayed or otherwise presented by front-end device 104 to user 106 who may select or re-configure one or more bundles in an effort to achieve sale of one or more bundles of items.

Back-end device 102 aggregates a variety of types of data, or item information, related to items that are available for bundling from a number of sources. As shown in FIG. 1, the types of item information aggregated by back-end device 102 include first type of item information 110, second type of item information 112, third type of item information 114, and fourth type of item information. Those ordinarily skilled in the art would appreciate that, although four types of item information are depicted in the example of FIG. 1, the actual number of types of item information aggregated may vary in various implementations. The types of item information may include but are not limited to, for example, competition pricing, item recommendation and status, cross-market data on existing bundles, and item cost, pricing and other relevant data including: items that are frequently purchased together, items that are frequently sold in bundles, top-selling items, sale history (e.g., from the past six months). Sources of the types of item information 110, 112, 114 and 116 may include, for example, a CRM personalized tool, merchant's order management system, merchant database of items for sale, the Internet, and any suitable data source. Back-end device 102 may index the aggregated item information so that the item information on any given item may be searchable for fast retrieval. The item information is cached or stored, for example, in database 108.

When back-end device 102 receives an input from user 106, through front-end device 104, that indicates or selects base item for bundling recommendation, back-end device 102 identifies a number of candidate items that are suitable for bundling with base item and groups the base item and the candidate items into a respective number of bundles. Back-end device 102 ranks the candidate items in an order indicative of suitability of each item for bundling with the base item. The ranking may be based on one or more factors, including but not limited to: the number of times the items have been configured together in all the markets, the number of times the items have been recommended by a customer relationship management (CRM) personalized tool to be a bundle with different combinations, customer purchase behavior (e.g., items frequently bought together), top selling items based on the quantity ordered, and item competitive price margin. The ranked items are displayed as item bundling recommendation to user 106 by front-end device 104. Alternatively or additionally, back-end device 102 groups base item and candidate items into bundles, e.g., each of the bundles respectively includes the base item and one or more of the candidate items, and ranks the bundles based on aforementioned factors and/or other factors for front-end device 104 to display the bundles in the ranked order to user 106.

Back-end device 102 also calculates profit margin regarding each of the bundles is calculated for front-end device 104 to display to user 106. For any given bundle, user 106 may add one or more items to or delete one or more items from the bundle to re-configure the bundle, and back-end device 102 may calculate a new profit margin thereof for front-end device 104 to display to user 106. Upon viewing the calculated profit margins of the bundles, including the re-configured bundle, user 106 may decide to re-configure one or more of the bundles. Back-end device 102 may track performance of the bundles, e.g., sales volume of each bundle, and store performance data in database 108. User 106 may view the performance data via front-end device 104. Back-end device 102 may use the performance data in future grouping of items to predictively configure bundles for recommendation to user 106.

Figure 2:
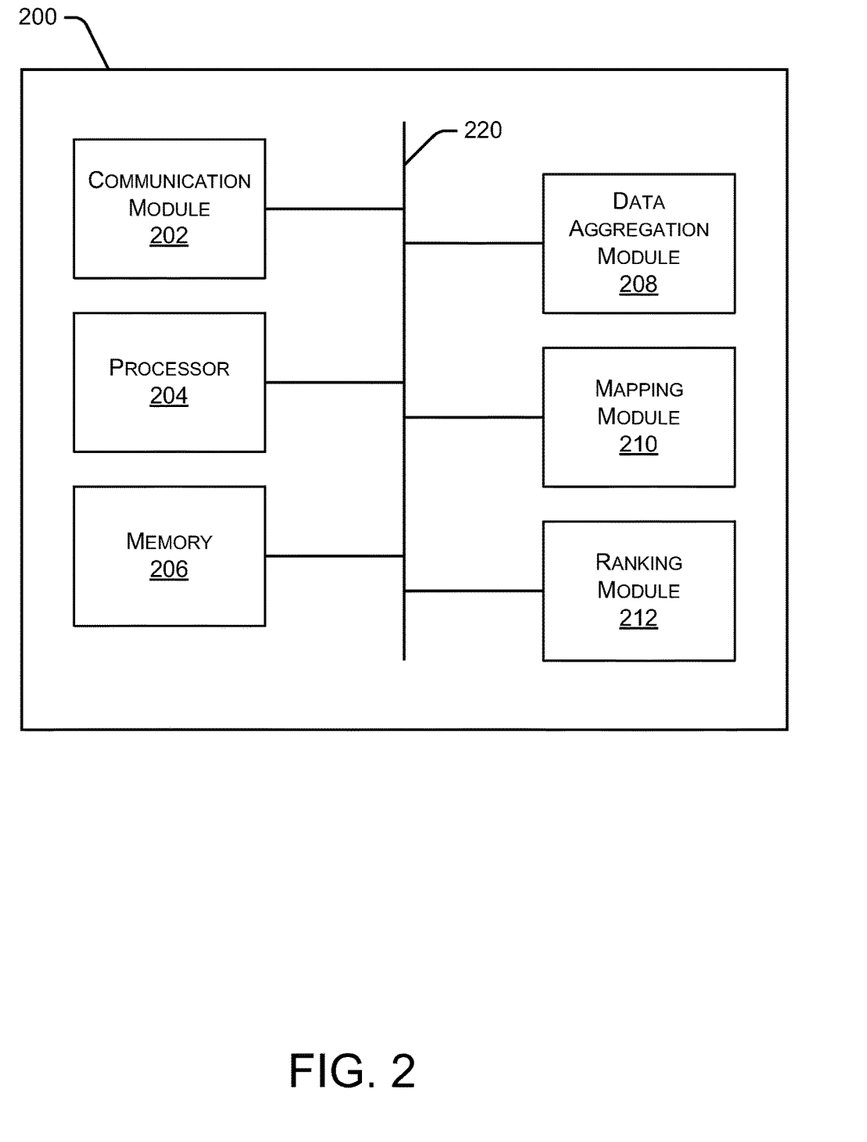
FIG. 2 is a block diagram depicting an embodiment of a computing device configured to implement systems and methods of the present disclosure.

FIG. 2 is a block diagram depicting an embodiment of a computing device 200 configured to implement systems and methods of the present disclosure. Computing device 200 performs various functions related to the operation of back-end device 102, as discussed herein. In some embodiments, back-end device 102 includes multiple ones of computing device 200 that cooperatively implement the functions described herein. Computing device 200 includes a communication module 202, a processor 204, and a memory 206. Communication module 202 allows computing device 200 to communicate with other systems, such as communication networks, other servers, front-end device 104, etc. Processor 204 executes one or more sets instructions to implement the functionality provided by computing device 200. Memory 206 stores these instructions as well as other data used by processor 204 and other modules contained in computing device 200.

Computing device 200 also includes a data aggregation module 208, which aggregates various types of item information extracted or retrieved from a variety of sources as described herein. In some embodiments, data aggregation module 208 indexes and caches item information to facilitate fast retrieval and enhance user experience. Computing device 200 further includes a mapping module 210 that groups base item and candidate items into recommended bundles. Mapping module 210 also maps base item and candidate items between the market which user 106 is in and one or more other markets and between the market user 106 is in and the market a competitor is in. Additionally, computing device 200 includes a ranking module 212. Ranking module 212 ranks candidate items in an order indicative of suitability of each candidate item for bundling with the base item. Ranking module 212 also performs an overall ranking that sorts the recommended bundles an order of preference (e.g., a descending order of preference). A data communication bus 220 allows the various systems and components of computing device 200 to communicate with each other.

For example, memory 206 may store data and one or more sets of instructions, and processor 204 may execute the one or more sets of instructions and control communication module 202, data aggregation module 208, mapping module 210, and ranking module 212 to generate a list of a plurality of candidate items that can be associated to a base item to form a plurality of bundles, and display the list of candidate items to user 102, e.g., via front-end device 104, in a ranked order. More specifically, processor 204 may control data aggregation module 208 to aggregate data related to at least the base item and the candidate items. Processor 204 may control mapping module 210 to group the base item and the candidate items into the plurality of bundles. Moreover, processor 204 may control ranking module 212 to rank the candidate items in the ranked order.

Figure 3:
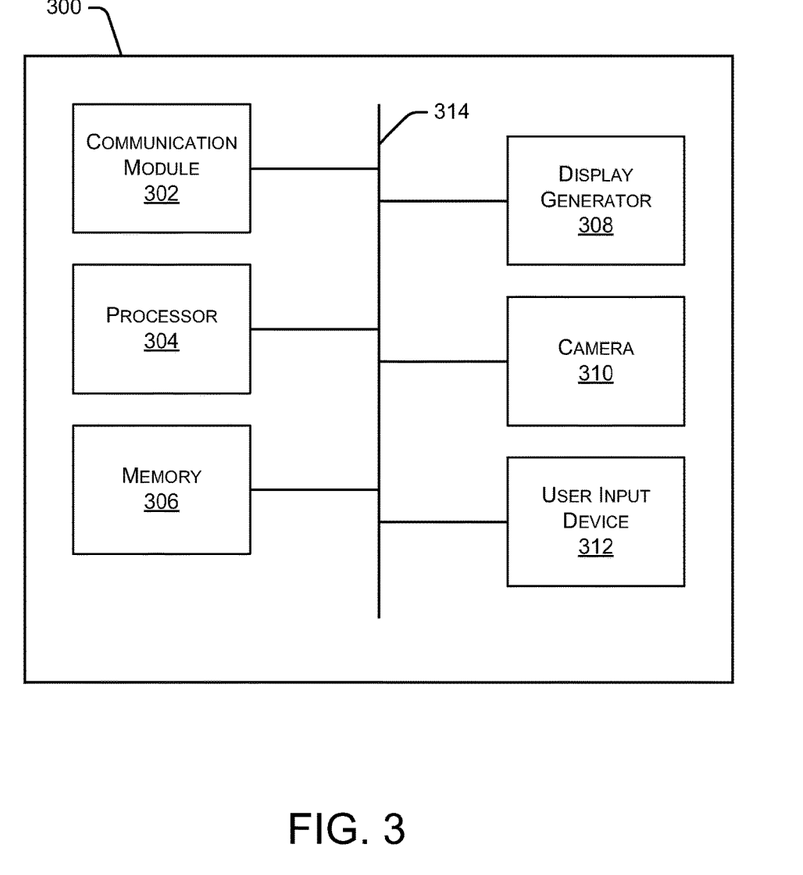
FIG. 3 is a block diagram depicting an embodiment of a user device.

FIG. 3 is a block diagram depicting an embodiment of a user device 300. User device 300 performs various functions related to the operation of front-end device 104, as discussed herein. User device 300 is operated by a user such as user 106 to interact with back-end device 102 to indicate or select base item and receive recommended bundles. User device 300 includes a communication module 302, a processor 304, and a memory 306. Communication module 302 allows user device 300 to communicate with other systems, such as communication networks, other user devices, back-end device 102, and the like. Processor 304 executes one or more sets of instructions to implement the functionality described herein with respect to user device 300. Memory 306 stores these instructions as well as other data used by processor 304 and other modules contained in user device 300.

User device 300 also includes a display generator 308, which generates various signals that enable a display device to present information to user 106. In some embodiments, display generator 308 generates various signals that present a user interface to the user of user device 300. A user input device 312 allows a user to interact with user device 300. Example user input devices 312 include keyboard, computer mouse, pointing devices, buttons, switches, touch-sensitive portions of a touch-sensitive display device, and the like. A data communication bus 314 allows the various systems and components of user device 300 to communicate with each other.

Figure 4:
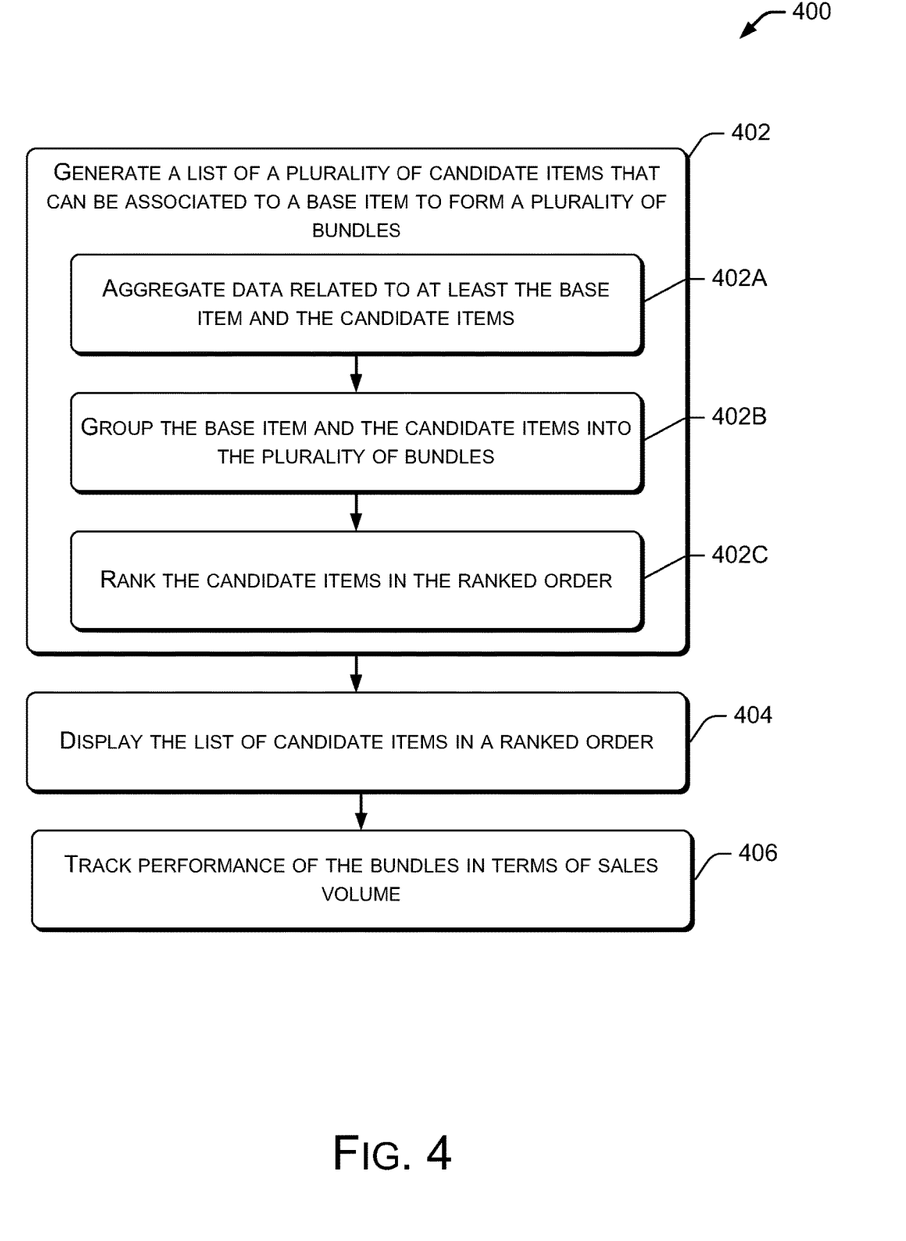
FIG. 4 is a flowchart diagram of an embodiment of a process for predictive item bundling recommendation.

FIG. 4 illustrates an example process 400 for predictive item bundling recommendation. Example process 400 includes one or more operations, actions, or functions as illustrated by one or more of blocks 402 and 404. Although illustrated as discrete blocks, various blocks may be divided into additional blocks, combined into fewer blocks, or eliminated, depending on the desired implementation. Process 400 may be implemented by one or more processors including, for example, back-end device 102 and computing device 200. For illustrative purposes, the operations described below are performed by a processor of back-end device 102 as shown in FIG. 1.

At 402, back-end device 102 may generate a list of a plurality of candidate items that can be associated to a base item to form a plurality of bundles. At 404, back-end device 102 may display the list of candidate items in a ranked order. Optionally, at 406, back-end device 102 may track performance of the bundles in terms of sales volume.

To illustrate, consider an example where a merchant or consumer, e.g., user 106, would benefit from predictive recommendation on items suitable to be bundled with a game console. In this example, back-end device 102 can generate a list of candidate items one or more of which may be sold together with the game console as bundles. The candidate items may include a number of accessories such as remote control for the game console as well as different games to be played using the game console. The list of accessories and games are displayed in a ranked order, e.g., a descending order of profit margin from the merchant's perspective. In other implementations, the list of items may be ranked and displayed in an ascending order or in a ranked order according to a different preference other than profit margin.

In one embodiment, in generating the list of candidate items, at 402A back-end device 102 may aggregate data related to at least the base item and the candidate items. More specifically, back-end device 102 may collect a plurality of types of item information associated with at least the base item and the candidate items, index the item information to render the item information searchable, and cache the item information. The types of item information may include some or all of the following: a market the user is in, one or more other markets, recommendation from a CRM tool, frequently bought together items, top selling items, and item pricing of one or more competitors.

In one embodiment, in generating the list of candidate items, at 402B back-end device 102 may also group the base item and the candidate items into the plurality of bundles. More specifically, back-end device 102 may group the base item and the candidate items based at least on a plurality of factors. Additionally, back-end device 102 may map the base item and the candidate items between a market the user is in and one or more other markets, and may map the base item and the candidate items between the market the user is in and a market a competitor is in. The factors based on which back-end device 102 groups the base item and the candidate items may include some or all of the following: department categorization, business data and customer shopping behavior, wherein the mapping the base item and the candidate items between the market the user is in and the one or more other markets utilizes at least universal product codes of the base item and the candidate items, and wherein the mapping the base item and the candidate items between the market the user is in and the market a competitor is in utilizes keywords related to the base item and the candidate items.

In one embodiment, in generating the list of candidate items, at 402C back-end device 102 may further rank the candidate items in the ranked order. More specifically, back-end device 102 may rank the candidate items in a descending order of suitability of bundling with the base item based at least on a plurality of factors, and sort the bundles in an order based on the ranking. The factors based on which back-end device 102 ranks the candidate items may include some or all of the following: a number of times at least some of the candidate items have been configured together in a plurality of markets, a number of times at least some of the candidate items have been recommended by a CRM tool, a frequency at least some of the candidate items have been purchased together, information on top-selling items based on a quantity ordered, and competitive price margins of the candidate items.

Figure 5A:
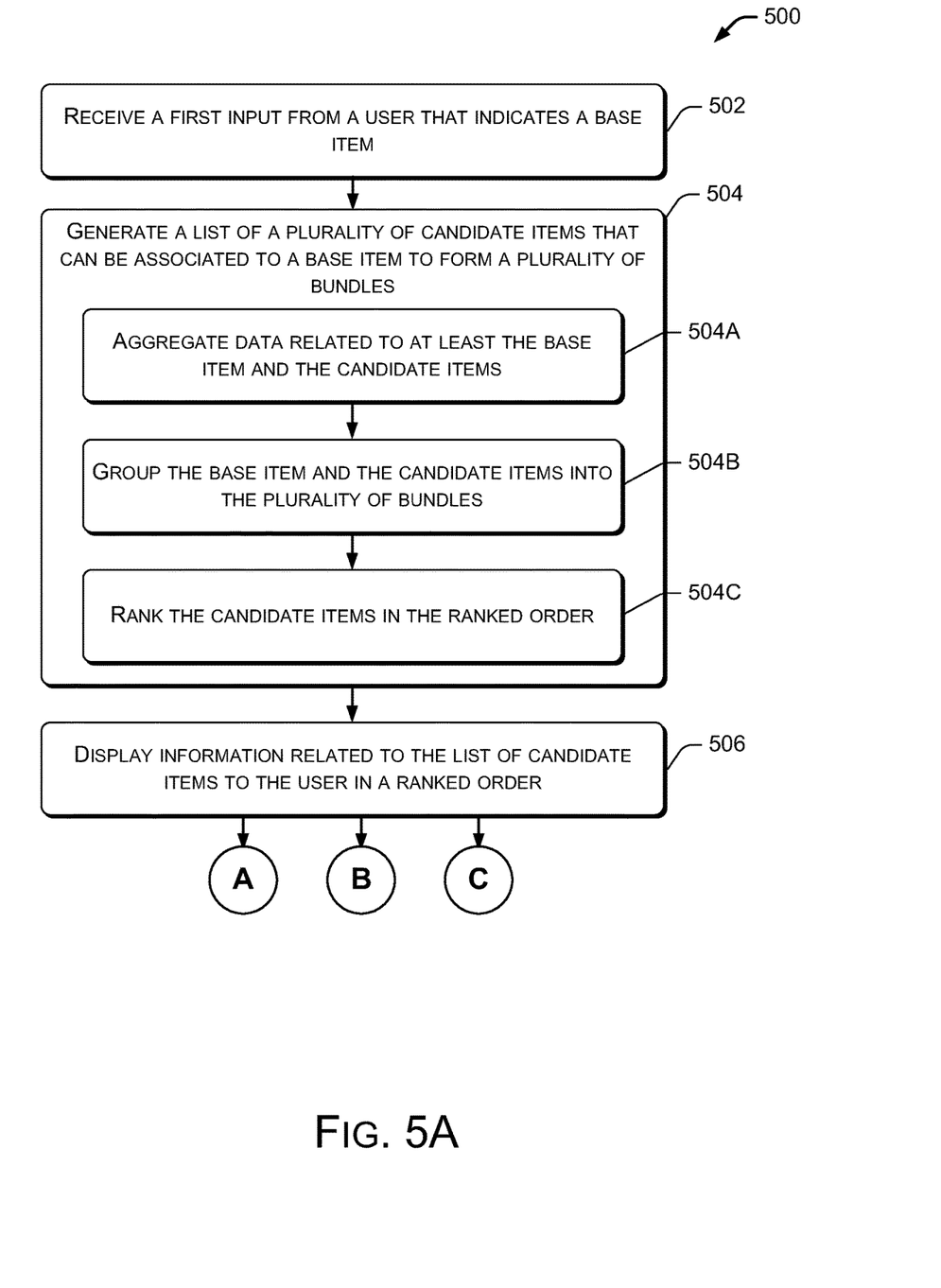
FIGS. 5A-5D is a flowchart diagram of alternative embodiments of a process for predictive item bundling recommendation.
Figure 5B:
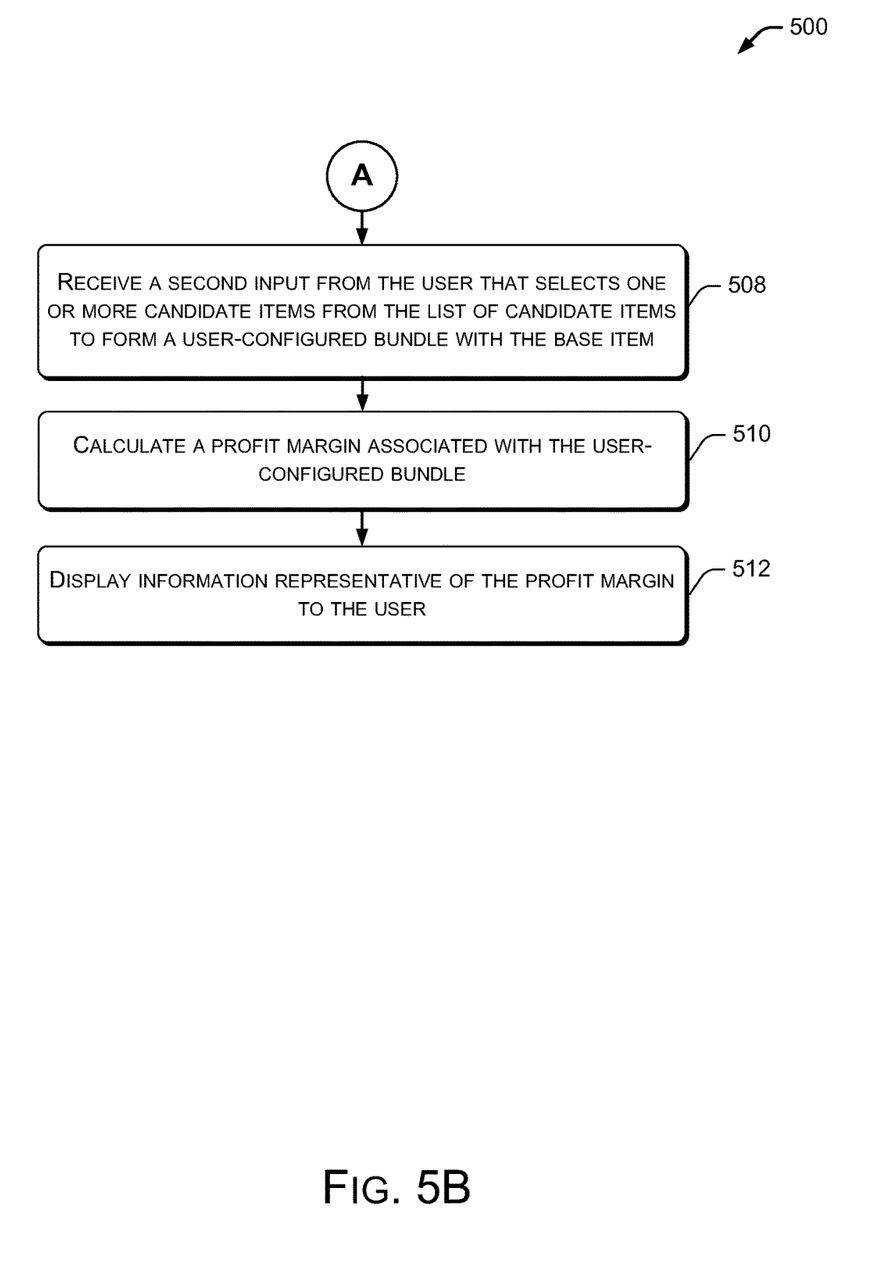
Figure 5C:
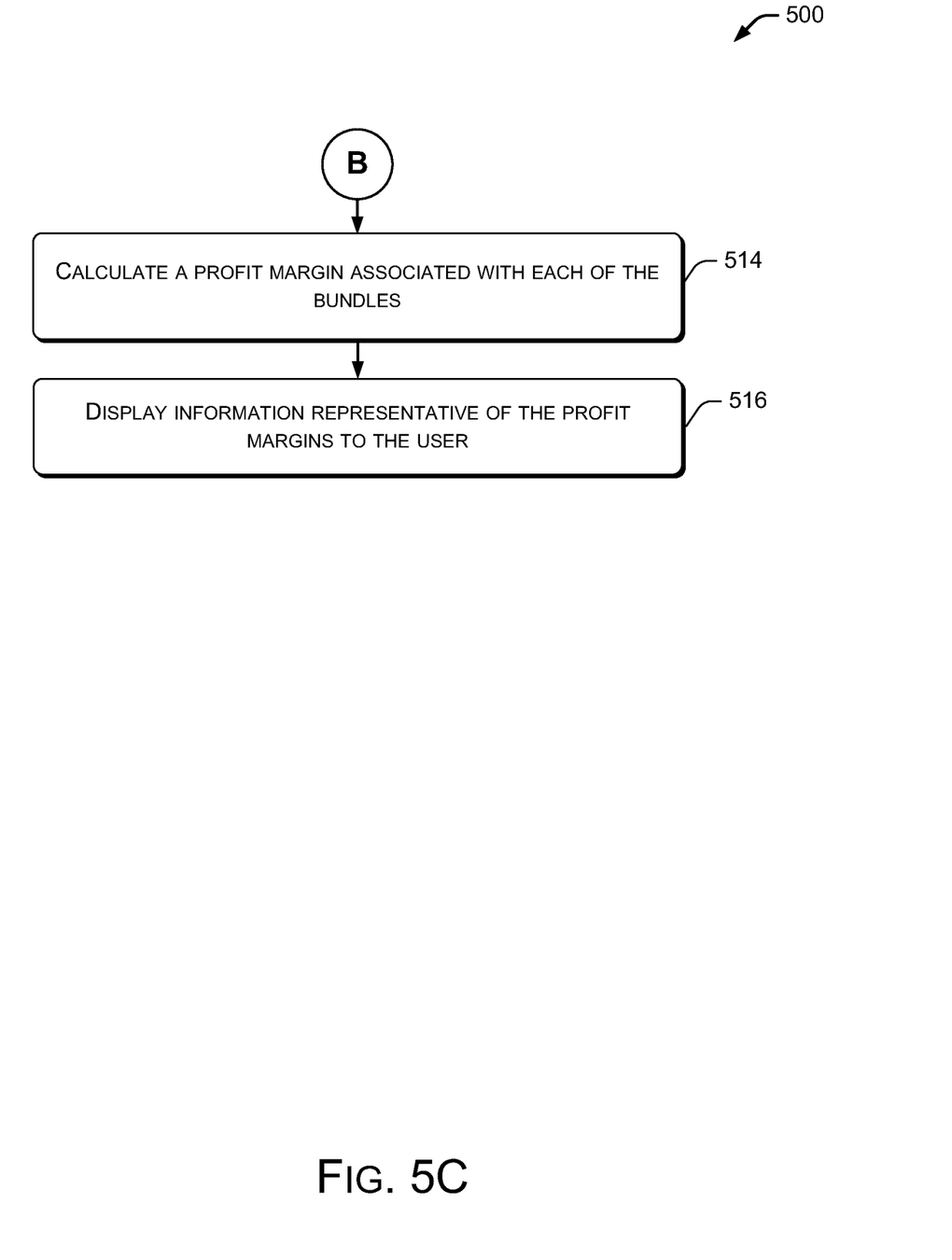
Figure 5D:
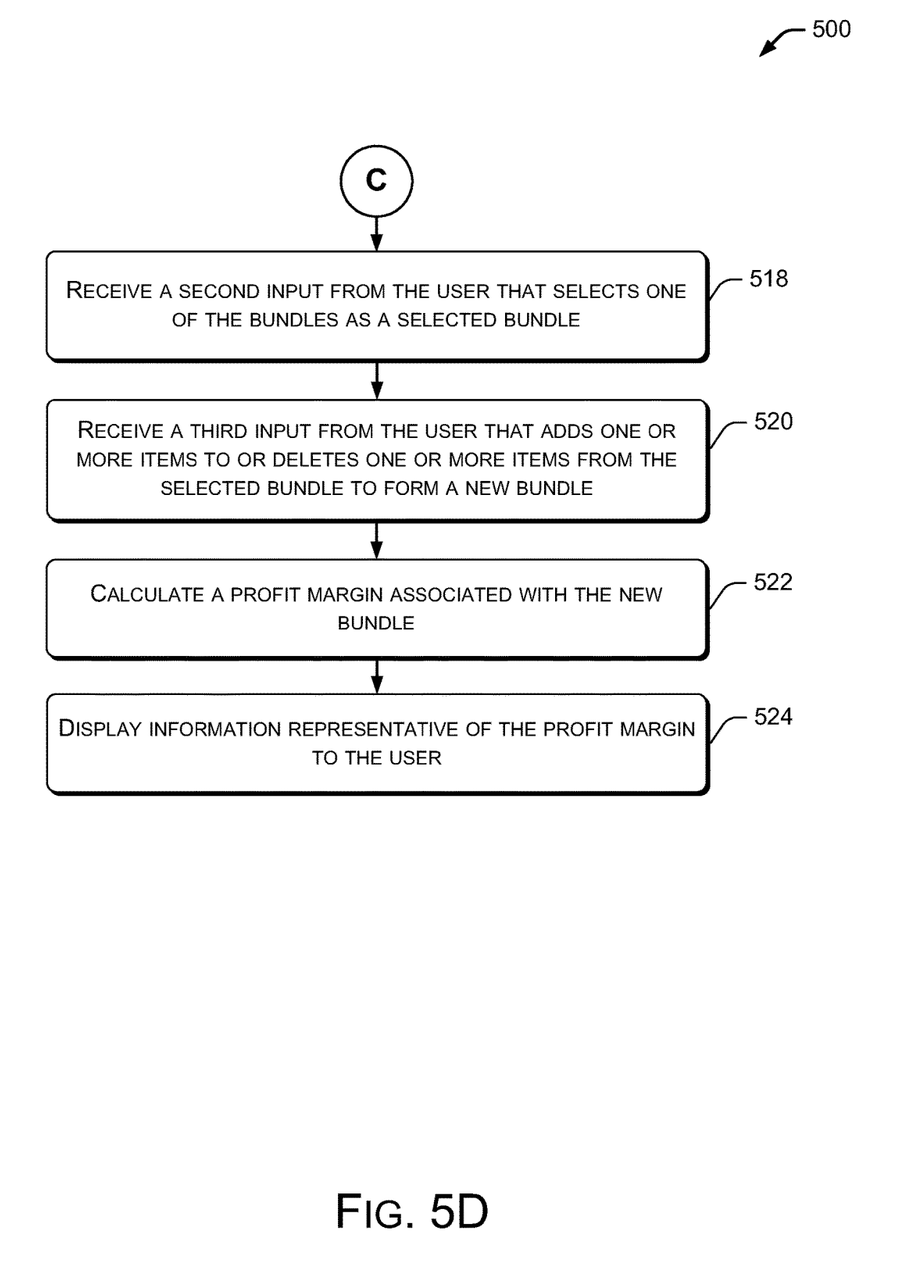

FIGS. 5A-5D is a flowchart diagram of alternative embodiments of a process 500 for predictive item bundling recommendation. FIGS. 5A and 5B illustrate one embodiment of process 500, FIGS. 5A and 5C illustrate another embodiment of process 500, and FIGS. 5A and 5D illustrate a further embodiment of process 500. Example process 500 includes one or more operations, actions, or functions as illustrated by one or more of blocks 502, 504 and 506. Although illustrated as discrete blocks, various blocks may be divided into additional blocks, combined into fewer blocks, or eliminated, depending on the desired implementation. Process 500 may be implemented by one or more processors including, for example, back-end device 102 and computing device 200. For illustrative purposes, the operations described below are performed by a processor of back-end device 102 as shown in FIG. 1.

At 502, back-end device 102 may receive a first input from user 106 that indicates a base item. At 504, back-end device 102 may generate a list of a plurality of candidate items that can be associated to the base item to form a plurality of bundles. At 506, back-end device 102 may display information related to the list of candidate items to user 106 in a ranked order. More specifically, at 504A, back-end device 102 may aggregate data related to at least the base item and the candidate items. At 504B, back-end device 102 may group the base item and the candidate items into the plurality of bundles. At 504C, back-end device 102 may rank the candidate items in the ranked order.

Using the example where a merchant or consumer, e.g., user 106, would benefit from predictive recommendation on items suitable to be bundled with a game console, user 106 submits user input, e.g., via front-end device 104, to back-end device 102 an indication or selection of a game console as the base item to be bundled. Back-end device 102 generates a list of candidate items including accessories and games to be played using the game console. The list of accessories and games are displayed in a ranked order, e.g., a descending order of profit margin from the merchant's perspective. In other implementations, the list of items may be ranked and displayed in an ascending order or in a ranked order according to a different preference other than profit margin.

As shown in FIG. 5B, in one embodiment, process 500 may include additional operations such as 508, 510 and 512. At 508, back-end device 102 may receive a second input from user 106 that selects one or more candidate items from the list of candidate items to form a user-configured bundle with the base item. At 510, back-end device 102 may calculate a profit margin associated with the user-configured bundle. At 512, back-end device 102 may display information representative of the profit margin to user 106.

For example, user 106 submits an input to back-end device 102 to select one or more of the accessories and games to be bundled with the game console. In response, back-end device 102 calculates and displays, via front-end device 104, a percentage, a figure, a graph or any suitable information that represents the profit margin associated with this particular bundle of game console and one or more accessories and/or games.

In one embodiment, back-end device 102 may display the bundles in the ranked order, with each of the bundles respectively comprising the base item and one or more of the candidate items.

As shown in FIG. 5C, in another embodiment, process 500 may include additional operations such as 514 and 516. At 514, back-end device 102 may calculate a profit margin associated with each of the bundles. At 516, back-end device 102 may display information representative of the profit margins to user 106.

For example, back-end device 102 calculates and displays, via front-end device 104, a percentage, a figure, a graph or any suitable information that represents the respective profit margin associated with each bundle of game console and one or more accessories and/or games.

As shown in FIG. 5D, in yet another embodiment, process 500 may include additional operations such as 518, 520, 522 and 524. At 518, back-end device 102 may receive a second input from user 106 that selects one of the bundles as a selected bundle. At 520, back-end 102 may receive a third input from user 106 that adds one or more items to or deletes one or more items from the selected bundle to form a new bundle. At 522, back-end device 102 may calculate a profit margin associated with the new bundle. At 524, back-end device 102 may display information representative of the profit margin to user 106.

For example, user 106 submits one input, to back-end device 102 to select one or more of the accessories and games to be bundled with the game console, and another input to add or delete one or more candidate items to form a re-configured bundle. In response, back-end device 102 calculates and displays, via front-end device 104, a percentage, a figure, a graph or any suitable information that represents the profit margin associated with this re-configured bundle of game console and one or more accessories and/or games.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
receiving, at a back-end device, a selection of a base item from a front-end device of a user, wherein the user comprises a merchant, wherein the front-end device communicates with the back-end device;
caching, at a database, item information received from multiple item sources by the back-end device, wherein the back-end device communicates with the database and the multiple item sources;
predicting, by one or more processors at the back-end device, a portion of a plurality of candidate items to rank and display to the user one or more bundle configurations that match the base item, wherein the plurality of candidate items is associated with the base item and wherein predicting the portion of the plurality of candidate items to rank and display to the user the one or more bundle configurations that match the base item comprises:
aggregating, by the one or more processors at the back-end device, the item information associated with the plurality of candidate items, wherein aggregating the item information associated with the plurality of candidate items comprises:
collecting, by the one or more processors at the back-end device, a plurality of types of the item information associated with the plurality of candidate items;
indexing, by the one or more processors at the back-end device, the item information to render the item information searchable; and
caching, by the one or more processors at the back-end device, the item information stored in the database;
mapping, by the one or more processors at the back-end device, the base item and the plurality of candidate items between at least one of a market the user is in and one or more other markets, or the market the user is in and a market a competitor of the user is in; and
generating, by the one or more processors at the back-end device, a list of the portion of the plurality of candidate items;
facilitating, by the one or more processors at the back-end device, display of the list of the portion of the plurality of candidate items in a ranked order to the user, the ranked order being based at least in part on:
a cost saving to the user by purchasing a respective candidate item of the portion of the plurality of candidate items; and
a popularity of purchasing the respective candidate item of the portion of the plurality of candidate items, the popularity based at least in part on past sales of the respective candidate item;
facilitating, by the one or more processors at the back-end device, display of a portion of the item information to the front-end device of the user in the ranked order and a calculated profit margin associated with each of the one or more bundle configurations based on the ranked order, the portion of the item information being associated with the portion of the plurality of candidate items;
receiving, by the one or more processors at the back-end device, instructions from the user to (a) add or (b) delete a particular item from the portion of the item information as displayed; and
calculating, by the one or more processors at the back-end device, a new profit margin based on adding or deleting the particular item of a particular one of the one or more bundle configurations to display to the front-end device of the user.

2. The method of claim 1, wherein:
the plurality of types of the item information comprises at least one of:
the market the user is in;
the one or more other markets;
recommendations from a customer relationship management (CRM) tool;
frequently bought together items;
top selling items; or
item pricing of one or more competitors.

3. The method of claim 1, wherein:
generating the list of the portion of the plurality of candidate items further comprises grouping, by the one or more processors at the back-end device, the base item and one or more of the plurality of candidate items into a plurality of bundles, wherein the one or more bundle configurations comprise the plurality of bundles; and
the method further comprises storing the one or more bundle configurations in the database.

4. The method of claim 3, wherein:
grouping the base item and the one or more of the plurality of candidate items into the plurality of bundles comprises:
grouping, by the one or more processors at the back-end device, the base item and the one or more of the plurality of candidate items based at least on a plurality of factors.

5. The method of claim 4, wherein:
the plurality of factors comprise at least one of:
department categorization; or
business data and customer shopping behavior; and
mapping the base item and the plurality of candidate items comprises utilizing at least one or more universal product codes of the base item and one or more universal product codes of the plurality of candidate items and one or more keywords related to the base item and the one or more of the plurality of candidate items.

6. The method of claim 3, wherein:
generating the list of the portion of the plurality of candidate items further comprises ranking, by the one or more processors at the back-end device, the plurality of candidate items in the ranked order; and
the method further comprises storing the plurality of candidate items in the ranked order in the database.

7. The method of claim 6, wherein:
the ranking the plurality of candidate items in the ranked order comprises:
  ranking, by the one or more processors at the back-end device, the plurality of candidate items in a descending order of suitability of bundling with the base item based at least on a plurality of factors; and
  sorting, by the one or more processors at the back-end device, the plurality of bundles in an order based on the ranking.

8. The method of claim 7, wherein:
the plurality of factors comprise:
  a number of times at least some of the plurality of candidate items have been bundled together in a plurality of markets;
  a number of times at least some of the plurality of candidate items have been recommended by a customer relationship management (CRM) tool;
  a frequency at least some of the plurality of candidate items have been purchased together;
  information on top-selling items based on a quantity ordered; and
  competitive price margins of the plurality of candidate items.

9. The method of claim 3, further comprising:
tracking, by the one or more processors at the back-end device, performance of the plurality of bundles in terms of sales volume.

10. A method comprising:
receiving, at a back-end device, a first input from a user that indicates a base item, wherein the user comprises a merchant, wherein a front-end device communicates with the back-end device;
caching, at a database, item information received from multiple item sources by the back-end device, wherein the back-end device communicates with the database and the multiple item sources;
predicting, by one or more processors at the back-end device, a portion of a plurality of candidate items to rank and display to the user one or more bundle configurations that match the base item, wherein the plurality of candidate items is associated with the base item and wherein predicting the portion of the plurality of candidate items to rank and display to the user the one or more bundle configurations that match the base item comprises:
  aggregating, by the one or more processors at the back-end device, the item information associated with the plurality of candidate items, wherein aggregating the item information associated with the plurality of candidate items comprises:
    collecting, by the one or more processors at the back-end device, a plurality of types of the item information associated with the plurality of candidate items;
    indexing, by the one or more processors at the back-end device, the item information to render the item information searchable; and
    caching, by the one or more processors at the back-end device, the item information stored in the database;
  mapping, by the one or more processors at the back-end device, the base item and the plurality of candidate items between at least one of a market the user is in and one or more other markets or the market the user is in and a market a competitor of the user is in;
  generating, by the one or more processors at the back-end device, a list of the plurality of candidate items and the base item; and
  associating, by the one or more processors at the back-end device, the list of the plurality of candidate items with the base item to form a plurality of bundles;
facilitating, by the one or more processors at the back-end device, display of information related to the list of the portion of the plurality of candidate items to the front-end device of the user in a ranked order and a calculated profit margin associated with each of the one or more bundle configurations based on the ranked order, the ranked order being based at least in part on:
  a cost saving to the user by purchasing a respective candidate item of the plurality of candidate items; and
  a popularity of purchasing the respective candidate item of the plurality of candidate items, the popularity based at least in part on past sales of the respective candidate item;
facilitating, by the one or more processors at the back-end device, display of a portion of the item information to the user in the ranked order;
receiving, by the one or more processors at the back-end device, instructions from the user to (a) add or (b) delete a particular item from the portion of the item information as displayed; and
calculating, by the one or more processors at the back-end device, a new profit margin based on the adding or deleting of the particular item of a particular one of the one or more bundle configurations to display to the front-end device of the user.

11. The method of claim 10, further comprising:
receiving, at the back-end device, a second input from the user, the second input selects one or more candidate items from the list of the plurality of candidate items to form a first user-configured bundle with the base item.

12. The method of claim 11, further comprising:
calculating, by the one or more processors at the back-end device, a profit margin associated with the first user-configured bundle; and
facilitating, by the one or more processors at the back-end device, display of information representative of the calculated profit margin to the user.

13. The method of claim 10, wherein:
facilitating display of the information related to the list of the plurality of candidate items to the user in the ranked order comprises:
  displaying, by the one or more processors at the back-end device, the plurality of bundles in the ranked order associated with a particular profit margin for each of the plurality of bundles, wherein each of the plurality of bundles respectively comprises the base item and one or more of the plurality of candidate items.

14. The method of claim 13, further comprising:
calculating, by the one or more processors at the back-end device, a profit margin associated with the each of the plurality of bundles; and facilitating, by the one or more processors at the back-end device, display of information by the profit margin associated with the each of the plurality of bundles to the user.

15. The method of claim 13, further comprising:
receiving, at the back-end device, a second input from the user that selects one of the plurality of bundles as a selected bundle; and
receiving, at the back-end device, a third input from the user that changes a number of items in the selected bundle to form a new bundle.

16. The method of claim 15, further comprising:
calculating, by the one or more processors at the back-end device, a second profit margin associated with the new bundle; and
facilitating, by the one or more processors at the back-end device, display of information by the second profit margin to the user.

17. An apparatus comprising:
a memory configured to store data and one or more sets of instructions; and
one or more processors coupled to the memory, the one or more processors configured to execute the one or more sets of instructions and perform operations comprising:
receiving, at a back-end device, a selection of a base item from a front-end device of a user, wherein the user comprises a merchant, wherein the front-end device communicates with the back-end device;
caching, at a database, item information received from multiple item sources by the back-end device, wherein the back-end device communicates with the database and the multiple item sources;
predicting, by the one or more processors at the back-end device, a portion of a plurality of candidate items to rank and display to the user one or more bundle configurations that match the base item, wherein the plurality of candidate items is associated with the base item and predicting the portion of the plurality of candidate items to rank and display to the user the one or more bundle configurations that match the base item comprises:
aggregating, by the one or more processors at the back-end device, the item information associated with the plurality of candidate items, wherein aggregating the item information associated with the plurality of candidate items comprises:
collecting, by the one or more processors at the back-end device, a plurality of types of the item information associated with the plurality of candidate items;
indexing, by the one or more processors at the back-end device, the item information to render the item information searchable; and
caching, by the one or more processors at the back-end device, the item information stored in the database;
mapping, by the one or more processors at the back-end device, the base item and the plurality of candidate items between at least one of a market the user is in and one or more other markets or the market the user is in and a market a competitor of the user is in, wherein the back-end device communicates with the multiple item sources; and
generating, by the one or more processors at the bback-end device, a list of the portion of the plurality of candidate items, and the base item;
facilitating, by the one or more processors at the back-end device, display of the list of the portion of the plurality of candidate items to the user in a ranked order, wherein:
generating the list of the portion of the plurality of candidate items comprises:
aggregating, by the one or more processors at the back-end device, other data related to at least the base item and at least the portion of the plurality of candidate items;
grouping, by the one or more processors at the back-end device, the base item and the portion of the plurality of candidate items into at least a portion of a plurality of bundles; and
ranking, by the one or more processors at the back-end device, the portion of the plurality of candidate items in the ranked order; and
the ranked order is based at least in part on:
a cost saving to the user by purchasing a respective candidate item of the portion of the plurality of candidate items; and
a popularity of purchasing the respective candidate item of the portion of the plurality of candidate items, the popularity based at least in part on past sales of the respective candidate item;
facilitating, by the one or more processors at the back-end device, display of a portion of the item information to the front-end device of the user in the ranked order and a calculated profit margin associated with each of the one or more bundle configurations based on the ranked order, the portion of the item information being associated with the list of the portion of the plurality of candidate items;
receiving, by the one or more processors at the back-end device, instructions from the user to (a) add or (b) delete a particular item from the portion of the item information as displayed; and
calculating, by the one or more processors at the back-end device, a new profit margin based on the adding or deleting of the particular item of a particular one of the one or more bundle configurations to display to the front-end device of the user.

18. The method of claim 1, wherein:
the item information comprises at least one of the following:
competitor pricing of a respective item of the plurality of candidate items;
item recommendations of the respective item of the plurality of candidate items;
a frequency that two or more items of the plurality of candidate items are sold together; and
a sales history of the respective item of the plurality of candidate items.

19. The method of claim 1, wherein:
the plurality of types of the item information comprises at least one of:
the market the user is in;
the one or more other markets;
recommendations from a customer relationship management (CRM) tool;
frequently bought together items;
top selling items; or
item pricing of one or more competitors;
generating, by the one or more processors at the back-end device, the list of the portion of the plurality of candidate items comprises grouping the base item and one or more of the plurality of candidate items into a plurality of bundles, wherein the one or more bundle configurations comprise the plurality of bundles;
storing, by the database, the plurality of bundles,
grouping the base item and the one or more of the plurality of candidate items into the plurality of bundles comprises:

grouping, by the one or more processors at the back-end device, the base item and the one or more of the plurality of candidate items based at least on a plurality of factors; and the mapping the base item and the one or more of the plurality of candidate items between at least one of the market the user is in and the one or more other markets, or the market the user is in and the market a competitor of the user is in, wherein the back-end device communicates with the multiple item sources;

the plurality of factors comprise at least one of:
department categorization; or
business data and customer shopping behavior;

the mapping the base item and the one or more of the plurality of candidate items comprises utilizing the at least one or more universal product codes of the base item, the one or more universal product codes of the plurality of candidate items, and the one or more keywords related to the base item and the one or more of the plurality of candidate items;

generating, by the one or more processors at the back-end device, the list of the portion of the plurality of candidate items further comprises ranking the plurality of candidate items in the ranked order; and the method further comprises storing the one or more bundle configurations in the database;

ranking the plurality of candidate items in the ranked order comprises:
ranking, by the one or more processors at the back-end device, the plurality of candidate items in a descending order of suitability of bundling with the base item based at least on the plurality of factors; and
sorting, by the one or more processors at the back-end device, the plurality of bundles in an order based on the ranking;

the plurality of factors comprise:
a number of times at least some of the plurality of candidate items have been bundled together in a plurality of markets;
a number of times at least some of the plurality of candidate items have been recommended by the customer relationship management (CRM) tool;
a frequency at least some of the plurality of candidate items have been purchased together; and
information on top-selling items based on a quantity ordered;

the item information comprises at least one of the following:
competitor pricing of a respective item of the plurality of candidate items;
item recommendations of the respective item of the plurality of candidate items;
a frequency that two or more items of the plurality of candidate items are sold together; and
a sales history of the respective item of the plurality of candidate items; and tracking, by the one or more processors at the back-end device, performance of the plurality of bundles in terms of sales volume.

20. The method of claim 10, wherein:
the item information comprises at least one of the following:
competitor pricing of a respective item of the plurality of candidate items;
item recommendations of the respective item of the plurality of candidate items;
a frequency that two or more items of the plurality of candidate items are sold together; and
a sales history of the respective item of the plurality of candidate items.

21. The method of claim 10, wherein:
generating the list of the plurality of candidate items comprises:
aggregating, by the one or more processors at the back-end device, data related to the plurality of candidate items;
grouping, by the one or more processors at the back-end device, the base item and the plurality of candidate items into the plurality of bundles, wherein the one or more bundle configurations comprise the plurality of bundles;
ranking, by the one or more processors at the back-end device, the plurality of candidate items in the ranked order; and
storing, by the database, data related to the plurality of candidate items;

facilitating, by the one or more processors at the back-end device, display of the information related to the list of the plurality of candidate items to the user in the ranked order comprises:
displaying the plurality of bundles in the ranked order, wherein each of the plurality of bundles respectively comprises the base item and one or more of the plurality of candidate items;

the item information comprises at least one of:
competitor pricing of a respective item of the plurality of candidate items;
item recommendations of the respective item of the plurality of candidate items;
a frequency that two or more items of the plurality of candidate items are sold together; or
sales history of the respective item of the plurality of candidate items; and the method further comprises:
receiving, at the back-end device, a second input from the user, the second input selects one or more candidate items from the list of the plurality of candidate items to form a user-configured bundle with the base item;
calculating, by the one or more processors at the back-end device, a profit margin associated with the user-configured bundle;
facilitating, by the one or more processors at the back-end device, display of information representative of the profit margin to the user;
receiving, at the back-end device, a third input from the user that selects one of the plurality of bundles as a selected bundle;
receiving, at the back-end device, a fourth input from the user that changes a number of items in the selected bundle to form a new bundle;
calculating, by the one or more processors at the back-end device, a second profit margin associated with the new bundle; and
facilitating, by the one or more processors at the back-end device, display of information representative of the second profit margin to the user.

22. The apparatus of claim 17, wherein:
the item information comprises at least one of:
competitor pricing of a respective item of the plurality of candidate items;
item recommendations of the respective item of the plurality of candidate items;
a frequency that two or more items of the plurality of candidate items are sold together; and
sales history of the respective item of the plurality of candidate items.

* * * * *